(12) United States Patent
Tarbouriech

(10) Patent No.: US 6,674,993 B1
(45) Date of Patent: Jan. 6, 2004

(54) METHOD AND SYSTEM FOR IDENTIFYING DATA LOCATIONS ASSOCIATED WITH REAL WORLD OBSERVATIONS

(75) Inventor: Philippe Tarbouriech, San Francisco, CA (US)

(73) Assignee: Microvision, Inc., Bothell, WA (US)

( * ) Notice: Subject to any disclaimer, the term of this patent is extended or adjusted under 35 U.S.C. 154(b) by 0 days.

(21) Appl. No.: 09/303,021

(22) Filed: Apr. 30, 1999

(51) Int. Cl.$^7$ ................................................. H04H 9/00
(52) U.S. Cl. .................. 455/2.01; 455/161.1; 455/186.1
(58) Field of Search ........................... 455/161.1, 186.1, 455/154.2, 131, 150.1, 151.1, 152.1, 154.1, 173.1, 179.1, 182.1, 192.3, 228, 92, 2.01, 76, 77; 725/9–21, 112

(56) References Cited

U.S. PATENT DOCUMENTS

| | | | |
|---|---|---|---|
| 4,067,061 A | 1/1978 | Jubasz | 364/900 |
| 4,344,136 A | 8/1982 | Panik | 364/424 |
| 4,395,624 A | 7/1983 | Wartski | 377/15 |
| 4,644,368 A | 2/1987 | Mutz | 346/33 |
| 4,685,061 A | 8/1987 | Whitaker | 364/424 |
| 4,804,937 A | 2/1989 | Barbiaux et al. | 340/52 |
| 4,853,856 A | 8/1989 | Hanway | 364/424.01 |
| 4,853,859 A | 8/1989 | Morita et al. | 364/424.04 |
| 4,856,072 A | 8/1989 | Schneider et al. | 381/86 |
| 4,858,133 A | 8/1989 | Takeuchi et al. | 364/424.04 |
| 4,866,616 A | 9/1989 | Takeuchi et al. | 364/424.04 |
| 4,875,167 A | 10/1989 | Price et al. | 364/424.04 |
| 4,939,652 A | 7/1990 | Steiner | 364/424.04 |
| 4,955,070 A * | 9/1990 | Welsh et al. | 455/2.01 |
| 5,046,007 A | 9/1991 | McCrery et al. | 364/424.04 |
| 5,065,321 A | 11/1991 | Bezos et al. | 364/424.04 |
| 5,072,701 A | 12/1991 | Khan et al. | 123/142.5 |
| 5,189,630 A | 2/1993 | Barstow et al. | |
| 5,214,792 A | 5/1993 | Alwadish | |
| 5,239,470 A | 8/1993 | Komatsu | 364/424.04 |
| 5,305,214 A | 4/1994 | Komatsu | 364/424.04 |
| 5,325,082 A | 6/1994 | Rodriguez | 340/438 |
| 5,337,236 A | 8/1994 | Fogg et al. | 364/424.04 |
| 5,379,219 A | 1/1995 | Ishibashi | 364/424.04 |
| 5,382,970 A * | 1/1995 | Kiefl | 455/2.01 |
| 5,440,301 A * | 8/1995 | Evans | 340/870.11 |

(List continued on next page.)

FOREIGN PATENT DOCUMENTS

| | | |
|---|---|---|
| EP | 0 687 083 A1 | 6/1995 |
| FR | 2555383 | 5/1985 |
| WO | WO 91/11062 | 7/1991 |
| WO | WO 97/01137 | 1/1997 |
| WO | WO 98/03923 | 1/1998 |
| WO | WO 98/21664 | 5/1998 |
| WO | WO 99/18518 | 4/1999 |

OTHER PUBLICATIONS

HighPoint Systems, Inc. http://www.highpoint.com.
Acey "Safeway Tests PalmPilot Shopping". Http://www.ny-times.com/techweb/TW_Safeway_Tests_PalmPilot.html.

*Primary Examiner*—Dwayne Bost
*Assistant Examiner*—Jean A Gelin

(57) ABSTRACT

A method and system for identifying data locations or uniform resource locators associated with physical observations in the real world. The method and system includes selecting certain physical parameters based upon an observation of real world objects and events and associating such physical parameters with data locations on the Internet or other computer network. When the real world object is observed or a real world event occurs, physical parameters relating to the object or event are sensed and recorded. These stored physical parameters are then communicated to a database, which returns a data location corresponding to the observed physical parameters. Thus, the present invention allows a user to "click" on objects or events in the real world in order to find data locations related to the objects or events in the on-line world.

6 Claims, 4 Drawing Sheets

U.S. PATENT DOCUMENTS

| | | |
|---|---|---|
| 5,550,738 A | 8/1996 | Bailey et al. .......... 364/424.04 |
| 5,664,110 A | 9/1997 | Green ........................ 705/26 |
| 5,703,795 A | 12/1997 | Mankovitz |
| 5,794,230 A | 8/1998 | Horadan et al. |
| 5,819,155 A | 10/1998 | Worthy |
| 5,826,164 A * | 10/1998 | Weinblatt .................. 455/2.01 |
| 5,890,175 A | 3/1999 | Wong et al. |
| 5,949,492 A | 9/1999 | Mankovitz |
| 6,163,683 A * | 12/2000 | Dunn et al. .............. 455/151.1 |

* cited by examiner

METHOD AND SYSTEM FOR IDENTIFYING DATA LOCATIONS ASSOCIATED WITH REAL WORLD OBSERVATIONS

FIELD OF THE INVENTION

The present invention relates to a method and system for sensing physical parameters corresponding to an object or event in the physical world and, based on the observed physical parameters, retrieving a data location on a computer network pointing to information associated with the physical world object or event.

BACKGROUND OF THE INVENTION

The increasing use of wide area networks such as the Internet has resulted in an explosion in the provision of on-line services. Computer users can access a vast wealth of information and services by utilizing a wide area network to establish a connection with other computers connected to the network.

The Internet is a global network of millions of computers belonging to various commercial and non-profit entities such as corporations, universities, and research organizations. The computer networks of the Internet are connected by gateways that handle data transfer and conversion of messages from a sending network to the protocols used by a receiving network. The Internet's collection of networks and gateways use the TCP/IP protocol. TCP/IP is an acronym for Transport Control Protocol/Interface Program, a software protocol developed by the Department of Defense.

Typically, the computers connected to a wide area network such as the Internet are identified as either servers or clients. A server is a computer that stores files that are available to other computers connected to the network. A client is a computer connected to the network that accesses the files and other resources provided by a server. To obtain information from a server, a client computer makes a request for a file or information located on the server using a specified protocol. Upon receipt of a properly formatted request, the server downloads the file to the client computer.

The World Wide Web is a system of Internet servers using specified Internet protocols and supporting specially formatted documents. The HyperText Transfer Protocol (HTTP) is the underlying protocol used by the World Wide Web. HTTP defines how messages are formatted and transmitted, and what actions Web servers and browsers should take in response to various commands. The other main standard of the World Wide Web is Hyper-Text Markup Language (HTML), which covers how documents and files are formatted and displayed. HTML supports links to other documents, as well as graphics, audio, and video files.

Users access the content contained on the Internet and the World Wide Web with an Internet Browser, which is a software application used to locate and display web pages. Files on a web server are identified by a uniform resource locator. A Uniform Resource Locator ("URL") is the global address of files and other resources on the Internet. The address indicates the protocol being used and specifies the IP address or the domain name where the file or resource is located. Typically, a URL identifies the name of the server and the path to a desired file on the server. For example, a URL for a web server may be constructed as follows: "http://<server>/<filepath>", where <server> identifies the server on which the file is located and <filepath> identifies the path to the file on the server. Thus, with the name of the server and the correct path to a file, a properly formatted URL accesses a desired file on a server connected to the World Wide Web.

As one can imagine, there are myriad documents and files accessible over the Internet. However, as discussed above, retrieving desired information on the Internet requires knowledge of an associated URL. Accordingly, if, for example, a consumer wishes to obtain information about or order a particular company's product on the World Wide Web, she must know the URL (data location) corresponding to that company's web site. Conversely, if a corporation desires the public to visit its web site containing information about its products, it will typically advertise its web site and corresponding URL in television, radio, print or other media. A consumer may then enter this URL, assuming he remembers it, into a browser and access the web site.

When a specific URL or data location is not known, search engines are a way of locating desired information. Typically, a user enters key words or search terms into a search engine, which returns a list of URLs corresponding to web sites or USENET groups where the key words or search terms were found. Often a search engine will return a large list of web sites, through which the user must wade in order to locate the few web sites relevant to his query.

Due in part to the proliferation of commercial web sites, consumers have become accustomed to the notion that there is a corresponding web site for the vast majority of products and services being commercially offered. Yet, as described above, access to a particular web site on the Internet, requires knowledge of the actual URL or access to a search engine. This becomes problematic, however, when there is no immediate access to a computer connected to the Internet. For example, when a radio listener hears a song on the radio and desires more information about it, he must remember the song title and the artist. Later, the listener can enter the song title or the artist as search terms in a typical search engine. Beyond this method, there are no alternative ways of identifying data locations or URLs based upon an observation of a particular product or event. In light of the foregoing, it can be seen that a need exists for alternative methods of identifying URLs or other data locations on a computer network.

SUMMARY OF THE INVENTION

The present invention provides a method and system for identifying data locations or uniform resource locators associated with physical observations in the real world. The method and system includes selecting certain physical parameters based upon an observation of real world objects and events and associating such physical parameters with data locations on the Internet or other computer network. When the real world object is observed or a real world event occurs, physical parameters relating to the object or event are sensed and recorded. These stored physical parameters are then communicated to a database, which returns a data location corresponding to the observed physical parameters. Thus, the present invention allows a user to use an appropriate sensing device to merely mark or key in on objects or events in the real world in order to find data locations related to the objects or events in the on-line world.

In a preferred embodiment of the system of the invention, one observed physical parameter is the channel or carrier frequency of a broadcast. The system includes a means for sensing the channel or carrier frequency of the broadcast. As set forth in more detail below, the means for identifying may be a remote device or "clicker" that uses a chirp signal to identify the channel or carrier frequency of the broadcast. The sensing unit may also be a hand-held, laptop, desktop, or other computer programmed to contain a list of available broadcasts that can be selected by the user. The system further includes a computer database having stored associations between these physical parameters (here, the channel or frequency of the broadcast) and one or more data locations, uniform resource locators, or Internet addresses. Thus, when the sensing means identifies and provides the channel of a broadcast, the computer database selects the corresponding uniform resource locator, Internet address or other data location. The system thus enables the identification and selection of an Internet address containing information corresponding to the broadcast, even though neither the broadcast nor the user provides an explicit Internet address.

In other preferred embodiments, the sensing means also includes a clock or other means for identifying the time, so that the physical observation may include a set of physical parameters including not only the channel of the broadcast, but also the time of the broadcast. Furthermore, the sensing means may include computer memory or other storage means for storing the channel and time so that these physical parameters may be provided to the computer database at a later time. Alternatively, the memory may store the Internet address provided by the database.

One aspect of the present invention includes a "clicker" or sensing unit for sensing physical parameters associated with the operation of a radio receiver. In one embodiment, the physical parameters include the frequency to which the radio receiver is tuned. The clicker includes a transducer for transmitting a chirp signal to the radio receiver during a chirp transmission time. A chirp signal is an audio signal modulated at a range of carrier frequencies during a chirp transmission time in a predetermined manner. The carrier frequency of the chirp signal varies over a range that includes the possible channels to which the receiver may be tuned. For example, in the FM radio frequency band, the chirp signal may vary from about 88 to 108 megahertz. The clicker also includes a receiver for receiving the audio output of the radio receiver. When the frequency of the chirp signal enters the range of the broadcast channel to which the radio receiver is tuned, the radio receiver receives and processes the chirp signal, thereby producing a corresponding output. The chirp receiver detects the audio output of the radio receiver. The clicker also includes a detector coupled to the chirp receiver for generating a detector signal when the detector detects the audio output corresponding to the chirp signal. Accordingly, the frequency of the chirp signal at which the detector signal is generated identifies the channel or frequency to which the radio receiver is tuned.

According to the present invention, a listener to a radio broadcast on a radio receiver may use the clicker to identify the channel of the broadcast by pressing a button on the clicker to initiate a chirp signal. The clicker then operates as discussed above to identify the frequency to which the radio receiver is tuned.

In yet other embodiments, the clicker includes the ability to identify and record other concurrent physical parameters, such as the time when the clicker or chirp signal is activated. For example, the clicker may include a real-time clock that provides a clock signal corresponding to the time the listener presses the clicker to initiate the chirp signal. Preferred embodiments of the clicker also include memory to store the channel or frequency of the broadcast and the time the listener activated the chirp signal, as well as means for transmitting the channel and time to the database of the present invention.

Other embodiments of the clicker for use in connection with a radio receiver include a "passive" sensing mechanism. The clicker of this embodiment includes a transducer for receiving the output of a radio receiver. The clicker also includes a first receiver for receiving modulated radio signals and a circuit for demodulating the radio signal into a demodulated signal with respect to a range of frequencies. The clicker further includes a detector for detecting a correlation between the audio output of the radio as provided by the transducer and the second demodulated signal processed by the demodulating circuit.

The database corresponding to the clicker described above may include Internet addresses or other data locations specific to a particular channel or frequency and a range of times. For example, the listener may become interested in the subject matter of a particular radio advertisement broadcast on a radio channel. According to the invention, the listener activates the clicker, which identifies and stores in memory the frequency to which the radio receiver is tuned and the time the clicker was activated. This information is transmitted to the database, as more fully described below, to identify the Internet address associated with the observed broadcast frequency and time and, hence, the radio advertisement. Thus, an Internet address associated with the time and channel of the broadcast may be determined even though access to the Internet is not available at the time of the broadcast and even though no Internet address is given. Moreover, the device described above allows the listener to essentially perform a search of the Internet without articulating a query and entering it into a search engine.

One skilled in the art will readily recognize that other embodiments of the invention for use in other contexts are possible. For example, the physical observation may include physical parameters such as geographical location, sound, voice, image, bar code or other event. Furthermore, the identifying means may include a telephone, television remote control unit or task bar application on a computer.

DETAILED DESCRIPTION OF THE INVENTION

Figure 1:
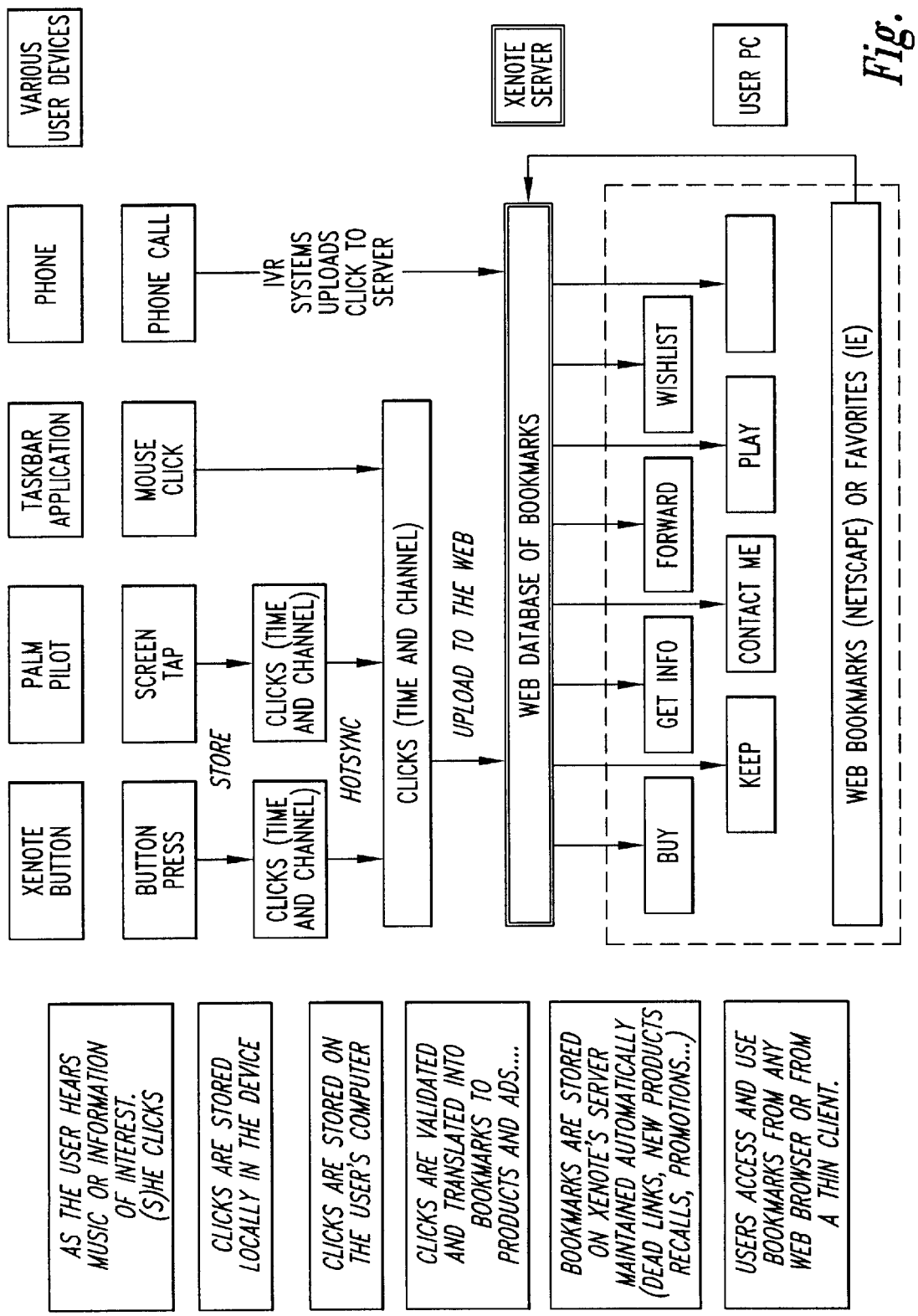
FIG. 1 is a flow chart diagram illustrating several embodiments of the present invention for use in the radio broadcast context.

As discussed above, the present invention provides methods and apparatuses for identifying a data location based upon physical observations in the real world. The method and system generally include identifying one or more physical parameters corresponding to physical observations of real world objects or events and associating such physical parameters with data locations. Another aspect of the present invention identifies data locations based upon physical observations. The method of this aspect of the present invention generally comprises sensing physical parameters associated with physical objects or events and transmitting the observed physical parameters to a database, which includes associations between these physical parameters and one or more data locations.

The present invention is applicable to the radio broadcast context. According to the invention, a radio listener is provided with a frequency sensing unit, which the listener activates when he/she hears a song or advertisement that is of interest. The sensing unit observes the frequency to which the radio is tuned. In preferred form, the sensing unit also observes the time the listener activated the sensing unit. The sensing unit is then operably connected to a database server of the present invention such that it transmits the observed physical parameters for identification of a data location or URL.

The database according to this embodiment of the present invention includes a list of data locations or URLs which relate to certain radio broadcasts. These data locations or URLs, for example, may point to the web site of a recording artist or a record label. The data location may also point to the web site of a corporation that advertises over a particular radio station. Associated with each of these data locations are the physical parameters of broadcast frequency and time. More specifically, the database of the present invention is arranged such that certain physical parameters or ranges of physical parameters correspond to each data location. For example, a particular data location pointing to a recording artist will have associated with it the frequency of the radio broadcast and the time(s) during which one or more of his songs was played. Therefore, when a listener hears that recording artist or song on the radio and desires more information relating to it, he simply activates the sensing unit. The sensing unit senses and stores the frequency of the broadcast and time of activation. This information is transmitted to the database of the present invention, which identifies a data location and transmits the data location to the listener. In this manner, the listener has gathered physical parameters from the real world off-line and subsequently used the physical parameters to search for information corresponding to these physical parameters on the Internet. Furthermore, unlike prior art search engines, the listener has performed a search without ever articulating any search terms. Additionally, the search terms used by the listener comprised physical parameters (time and frequency, in this circumstance) corresponding to the occurrence of a song in the real world. Such search terms would be meaningless to prior art searching techniques and systems.

Figure 5:
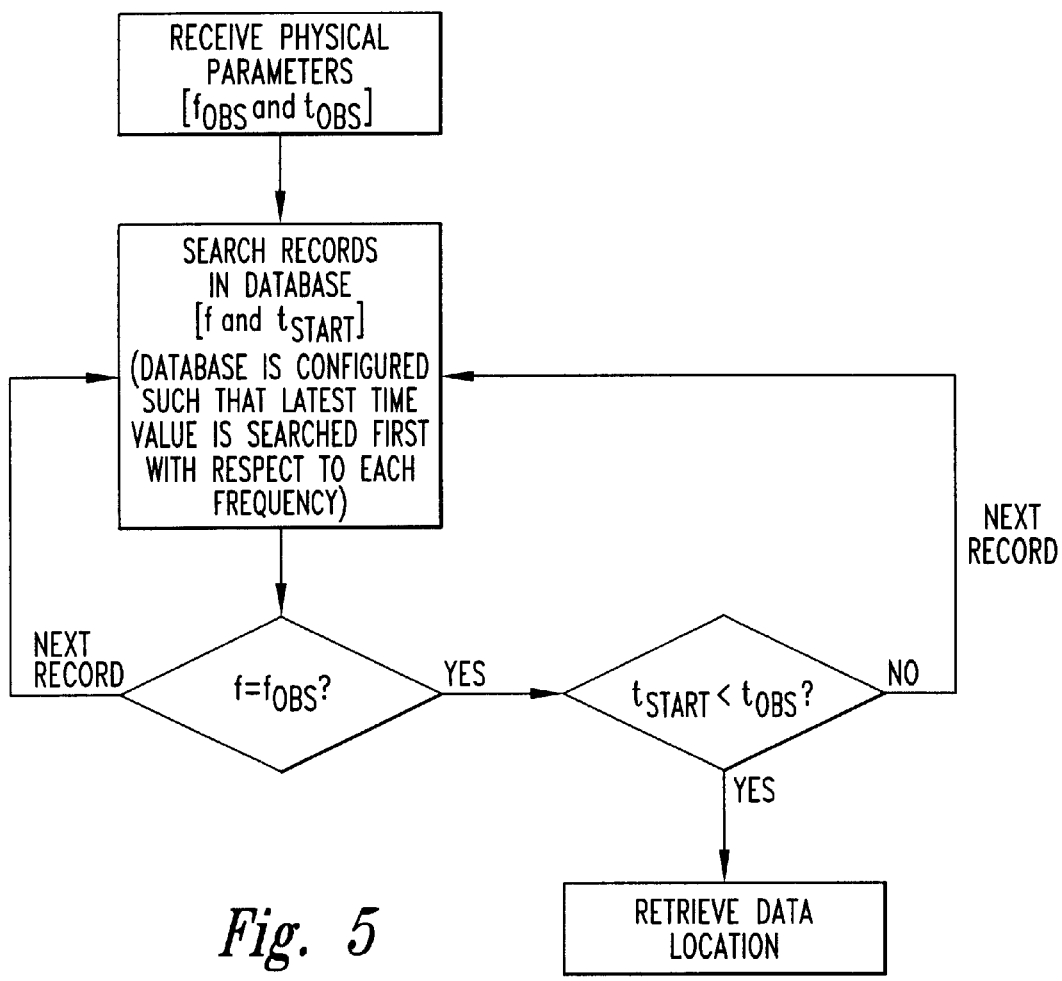
FIG. 5 is a flow chart diagram illustrating the general process steps performed by a first preferred server of the present invention as applied to the radio broadcasting context.

In one preferred embodiment, the database is arranged into a series of records each having four fields. The four fields include 1) the radio station or broadcast frequency, 2) the name of the song or advertisement, 3) the start time of the song or advertisement, and 4) the artist or entity associated with the song or advertisement and a data location. Other preferred databases include a fifth field designating the type of item stored in the record, i.e., whether the record represented a song or an advertisement. In a preferred form, the records of the database are arranged such that the record with the latest start time value with respect to each broadcast frequency is scanned first. Therefore, as illustrated in FIG. 5, when the server is presented with a broadcast frequency/ radio station and a time, it scans the database for the most recent record whose frequency/radio station matches the query and whose start time is anterior to the time presented by the query. If the server finds a record matching the user's query, it returns at least one data location or URL associated with these physical parameters.

Delivery of the data locations can be accomplished in a variety of ways. The data locations can be delivered via e-mail, fax, or even regular mail. The data location may also be delivered as part of an HTML document and accessed by the user's Internet browser. The data location may also be delivered as an Internet browser bookmark. The data location may further be stored in a user-specific account file on a server connected to the Internet. A user may access the account using an Internet browser and click on the data location to access the corresponding web site.

The sensing unit for use in the radio broadcasting example described above may comprise any suitable unit for recording a frequency and an activation time. FIG. 1 illustrates some of the methods and systems for capturing physical parameters associated with radio broadcasts and identifying associated data locations. As more fully described below, the sensing unit could observe the frequency to which the listener's radio is tuned. In other embodiments, the sensing unit is a hand-held computer programmed to display a listener's favorite radio stations. When the listener hears something that is of interest, he simply taps the screen on the icon representing the radio station to which he is listening. The sensing unit is also incorporated into a general purpose computer as a task bar application. The present invention also contemplates the use of a telephone as a sensing unit.

Figure 2:
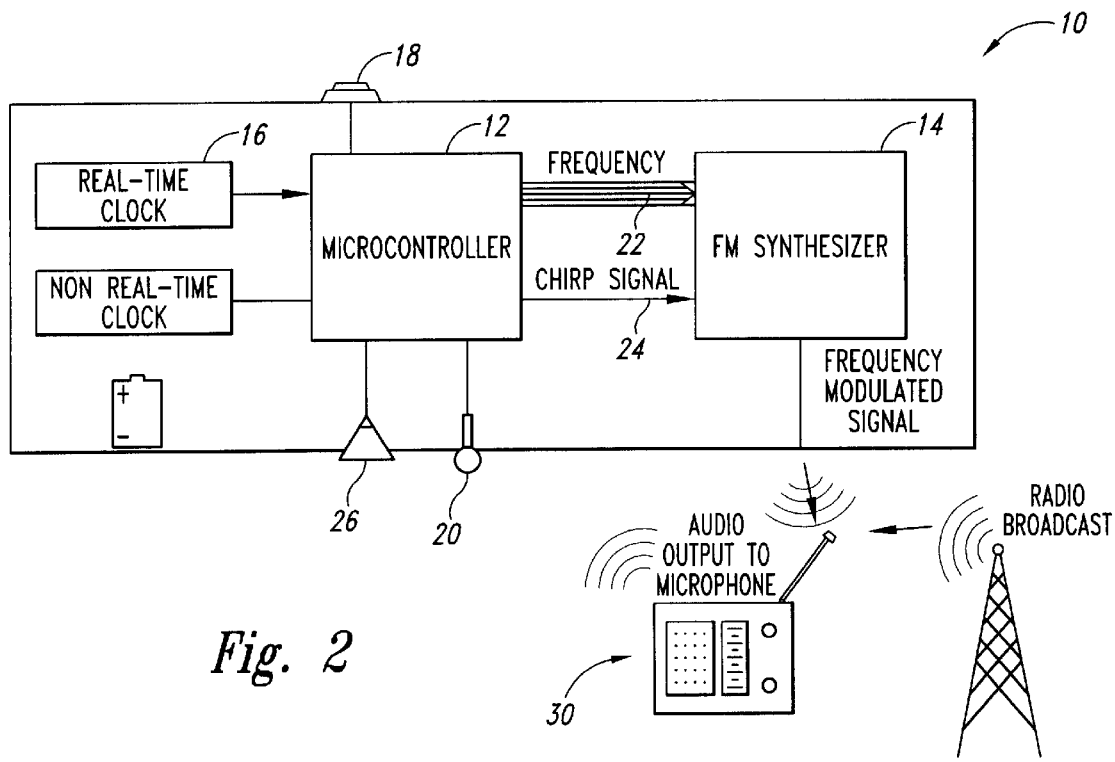
FIG. 2 is a functional block diagram of a first preferred sensing unit for identifying the frequency to which a radio receiver is tuned.

In some preferred embodiments, the sensing unit itself captures the frequency of the broadcast. More specifically and in one preferred embodiment, the sensing unit, when activated, emits a chirp signal over a range of frequencies and monitors the output of the radio receiver to detect the frequency to which the radio receiver is tuned. As shown in FIG. 2, a first preferred sensing unit 10 generally comprises microcontroller 12, frequency synthesizer 14, real-time clock 16, activation button 18, and microphone 20. Sensing unit 10 further includes a suitable power unit, such as a battery (not shown).

Microcontroller 12 includes frequency bus 22 and signal bus 24, both of which connect to frequency synthesizer 14. Microcontroller 12 sends a carrier frequency over frequency bus 22 and a chirp signal over signal bus 24 to frequency synthesizer 14. As is conventional in the art, frequency synthesizer 14 emits a chirp signal over the carrier frequency specified by microcontroller 12. Frequency synthesizer 14 can be any tunable modulator known in the art. In the first preferred embodiment, sensing unit 10 works in conjunction with a conventional FM radio receiver. Accordingly, frequency synthesizer 14 is a tunable frequency modulator.

As alluded to above, sensing unit 10 emits a chirp signal over a range of frequencies to detect the frequency to which the listener's radio is tuned. In a preferred form, the listener activates sensing unit 10 by depressing button 18. Microcontroller 12 starts at the lowest carrier frequency in the FM radio band (about 88 megahertz) and directs frequency synthesizer 14 to emit a chirp signal. Microcontroller 12 is then programmed to wait for a pre-determined amount of time. If the listener's radio 30 is tuned to this frequency, its audio output will correspond to the chirp signal. Microphone 20 senses the audio output of radio 30 thereby allowing microcontroller 12 to detect a correspondence between the audio output of radio 30 and the chirp signal. If, after the pre-determined amount of time, microcontroller 12 detects no correlation, microcontroller steps the carrier frequency up to the next possible carrier frequency according to the frequency spacing of the particular radio band and directs frequency synthesizer 14 to emit another chirp signal. This process is repeated until microcontroller 12 detects the chirp signal in the audio output of radio 30. When a correlation is detected, microcontroller 12 stores the corresponding carrier frequency and time from real-time clock 16 in memory.

The chirp signal may comprise any suitable signal. In the radio context, the frequency of the chirp signal is limited by the bandwidth of each channel. In preferred form, the chirp signal is a tone having a primary frequency between about 400 to 3000 Hz. The tone is preferably pleasing to the ear as it is within the audible range. The duration of the chirp signal, in one preferred embodiment, is about 10 milliseconds. In addition, microcontroller 12 is programmed with a delay of a 10 millisecond delay to allow for recognition of the chirp signal in the audio output of the radio. Of course, the chirp signal duration and delay between chirp signals provided above are merely examples and are only limited by the constraints of the hardware and software being used, and the propagation time required for the audio output of radio 30 to reach microphone 20. In the case of sensing a frequency in the FM band, the strength or power of the chirp signal emitted from sensing unit 10 must be sufficient to "overpower" the radio signal of the broadcast station to which the FM receiver is tuned.

In addition, microcontroller 12 can be programmed to reduce the time during which it seeks for the desired frequency. In one embodiment, microcontroller 12 is programmed to store the carrier frequency of the listener's favorite radio stations and to start with these frequencies before stepping through the entire frequency band. In other embodiments, sensing unit takes advantage of the side bands in the power spectra of the chirp signal. In this embodiment, microcontroller 12 begins with the next-to-lowest frequency in the radio band and steps through every two possible carrier frequencies. Of course, the power spectra of the chirp signal must have sufficient power in the sidebands to overpower the radio broadcast signal. If microcontroller detects a correspondence between the audio output of radio 30 and the chirp signal, it steps the carrier frequency down or up to seek a stronger radio output signal.

Figure 6:
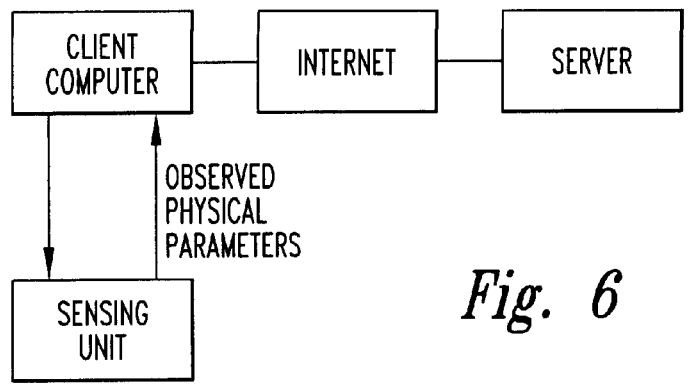
FIG. 6 is a functional block diagram illustrating an embodiment of the system of the present invention.

Sensing unit 10 also includes a means for transmitting stored physical parameters to a user's computer or directly to the server of the present invention. FIG. 6 illustrates the system of the present invention where stored physical parameters are transmitted to a client computer connected to the Internet. The client computer accesses the server of the present invention and transmits a data location request. In the first preferred embodiment, sensing unit 10 includes speaker 26 for transmitting the stored physical parameters to the listener's computer. Microcontroller 12 is programmed to distinguish between a short depression of button 18 and a long depression. A short depression of button 18 causes activation of sensing unit 10 to detect and store a frequency and activation time as described above. A long depression of button 18 causes transmission of stored physical parameters through microphone 26. The microphone input of the listener's computer receives the audio output of microphone 26. The listener's computer is programmed to store the data and to access the database of the present invention to identify a data location or URL that corresponds to the observed physical parameters. Of course, any suitable data transmission means could be used, including but not limited to infrared devices and hard-wired connections.

The listener's computer can be any conventional personal computer known in the art. In one preferred embodiment, the listener's computer is connected to the Internet via a dial-up connection or through a network line. Such communication could also be wireless. The listener's computer is further programmed, as discussed above, to receive at a standard microphone input the audio signal emitted by the sensing unit 10 and to transmit these observed physical parameters to the database of the present invention. In other preferred embodiments, the database of the present invention is not connected to the Internet. In this instance, the listener's computer includes appropriate communications software and a modem to access the database. In either of these embodiments, the listener's computer may also be configured to transmit a user identification number and password before access to the database is permitted.

Sensing unit 10 can also communicate directly to the database of the present invention. In this embodiment, the listener directly dials the server and, when prompted, depresses button 18 to transmit the stored physical parameters to the server through speaker 26 to the microphone in the telephone handset. In this embodiment, sensing unit 10 could also be configured to transmit a user identification number and password along with the stored physical parameters. Upon verification of the user's identification and password, the server uses the stored physical parameters to search the database for associated data locations or URLs. The server can then send any identified data locations to the user's e-mail account or back to the sensing unit.

Sensing unit 10 can be incorporated into a variety of devices. For example, sensing unit 10 comprises a stand-alone unit and is small enough to be used as a key chain similar to keyless remote systems for automobiles. Sensing unit 10 can also be incorporated as an additional feature of a common hand-held or other portable computer.

Figure 3:
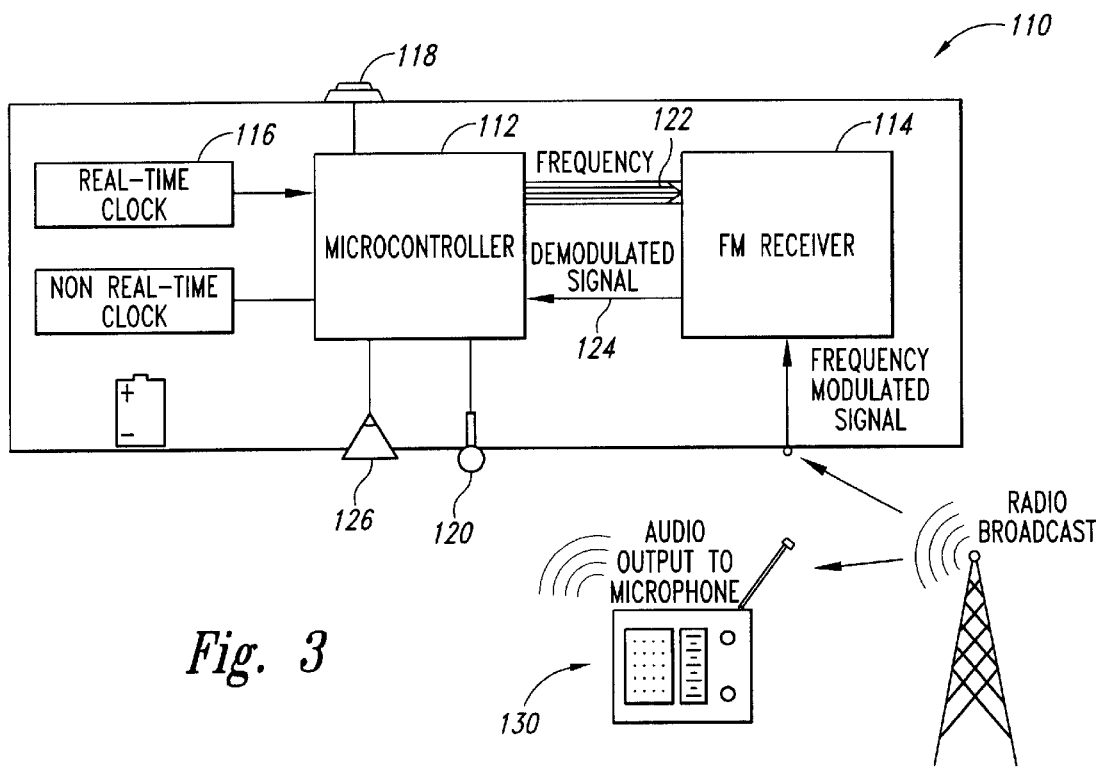
FIG. 3 is a functional block diagram of a second preferred sensing unit for identifying the frequency to which a radio receiver is tuned.

FIG. 3 illustrates a second preferred frequency sensing unit of the present invention. The second preferred sensing unit, rather than emitting a chirp signal, demodulates radio signals with respect to a range of frequencies and compares the demodulated signal to the observed audio output of the radio receiver. As FIG. 3 shows, sensing unit 110 generally comprises microcontroller 112, receiver 114, real-time clock 116, activation button 118, and microphone 120.

As described above, when the listener desires more information relating to a particular broadcast, she presses activation button 118 to energize sensing unit 110. Microcontroller 112 through data bus 122 tunes receiver 114 to the lowest carrier frequency in the FM band. Receiver 114 delivers the demodulated signal to microcontroller 112. Microcontroller detects the correlation, if any, between the audio output of radio 130 as captured by microphone 120 and the demodulated signal delivered by receiver 114. If no correlation is detected, microcontroller 112 tunes receiver 114 to the next available carrier frequency and compares the demodulated signal to the audio output of radio 130. This process is repeated until microcontroller 112 detects the requisite correlation. When the correlation is detected, microcontroller 112 stores the frequency at which the correlation was detected and the time, as provided by real-time clock 116, such correlation was detected. This information is then communicated to the listener's computer through speaker 126 as discussed above.

Figure 7:
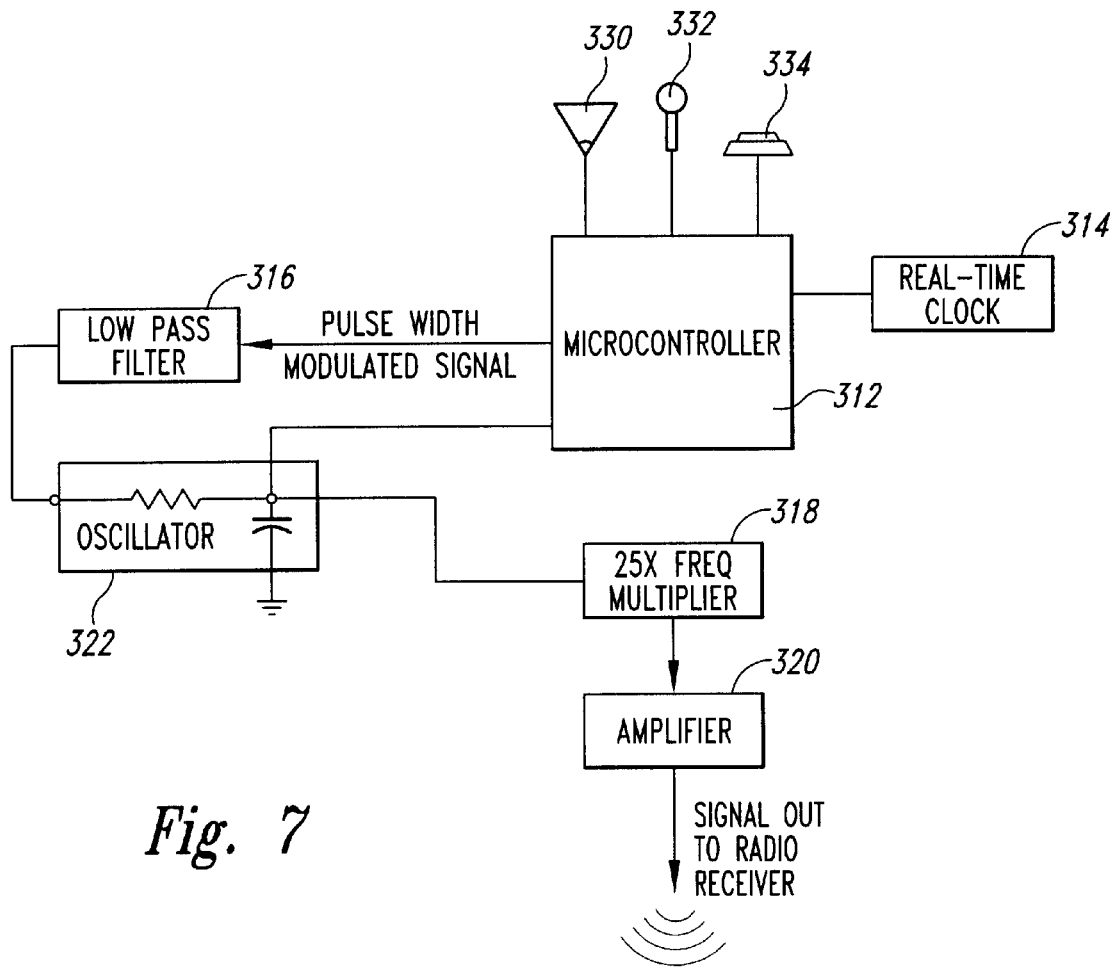
FIG. 7 illustrates a third preferred sensing unit for identifying the frequency to which a radio receiver is tuned.

FIG. 7 shows a third preferred embodiment of the sensing unit of the present invention. The third preferred embodiment transmits a chirp signal to the listener's radio receiver as in the first preferred embodiment, but includes different frequency modulation means. The third preferred embodiment generally comprises microcontroller 312, real-time clock 314, low-pass filter 316, multiplier 318, amplifier 320 and oscillator 322. Real-time clock 314 keeps accurate track of time based on the oscillation of a 32.567 KHz quartz, as is conventional in the art.

Oscillator 322 of the third preferred embodiment is an outside resistor-capacitor circuit, that generates a clock signal for microcontroller 312, as is standard in the art. However, unlike prior art devices, the reference voltage for oscillator 322 is the output of low-pass filter 316, which filters a pulse-width modulated signal from microcontroller 312 to extract the average voltage of the signal over its period. Accordingly, a signal having a larger duty cycle yields a higher output voltage from low-pass filter 316. Therefore, as one skilled in the art will recognize, the frequency of the clock signal provided to microcontroller 312 depends upon the duty cycle of the signal from microcontroller 312.

The signal output from oscillator 322 is also provided to multiplier 318, which multiplies the frequency of the signal to achieve the desired result. In the third preferred embodiment, oscillator 322 is configured to run at a predetermined range of frequencies including 4 megahertz. Therefore, if the oscillator output frequency is 4 megahertz, for example, 25-times frequency multiplication achieves a signal having a frequency of about 100 megahertz, which lies within the FM radio band. Of course, different frequencies are achieved by varying the output frequency of oscillator 322. As one skilled in the art will recognize, other clock speed and frequency multiplication parameters can be applied. In the third preferred embodiment, this multiplication occurs in two stages of 5-times multiplication to reduce the constraints and costs of the filters used for multiplication. Each multiplication stage involves filtering for the fifth harmonic of the signal. In the third preferred embodiment, a Schmitt trigger is used to condition the signal output of oscillator 322 and achieve a signal having a square waveform in order to maximize the power in the harmonics of the signal. The fifth harmonic of the square wave signal is filtered in a first multiplication stage. In the second multiplication stage, a second filter isolates the fifth harmonic of the waveform resulting from the first multiplication to achieve the desired frequency multiplication.

Amplifier 320 amplifies this frequency-multiplied signal and transmits it to the listener's radio. Thus, similar to that described above, the duty cycle of the signal provided by microcontroller 312 to low-pass filter 316 also controls the frequency of the signal ultimately transmitted to the listener's radio receiver. For each carrier frequency there exists a corresponding pulse width or duty cycle. Accordingly, to transmit a chirp signal (e.g. a 400 Hz tone) over a particular carrier frequency, microcontroller 312 modulates the pulse-width or duty cycle of the signal corresponding to a particular carrier frequency according to the 400 Hz chirp signal.

Additionally, identifying the exact speed of microcontroller 312 requires certain calibration steps. This involves running a program and timing it using real-time clock 314.

Real-time clock 314 interrupts the program after a specified amount of time (1 second for example). The speed of the processor is derived by counting how many instructions the processor executed in the specified time. In one preferred embodiment, this count is simplified by using a program whose sole function is to increment a counter. This processor speed is then multiplied as appropriate to yield the resulting carrier frequency. In the case of the third preferred embodiment, the ratio of the frequency of oscillator 322 to the internal clock speed of microcontroller 312 is 1:4.

Therefore, the processor speed is divided by four and multiplied by twenty-five to yield the resulting carrier frequency. The device is calibrated by running the processor at a low speed (88 megahertz /25, for example) and a relatively high speed (108 megahertz /25) and then comparing the observed frequencies with the intended frequencies.

Other than as set forth above, the third preferred embodiment operates much like the first preferred embodiment. Depression of button 334 activates microcontroller 312 which then outputs a pulse-width modulated signal corresponding to the lowest carrier frequency in the FM radio band. Microcontroller 312 monitors the output of the listener's radio through microphone 332. If the chirp signal is detected, the carrier frequency of the chirp signal is measured by timing the processor execution speed as described above. The corresponding frequency and time of activation are then stored in memory. These stored physical parameters are transmitted to the listener's computer through speaker 330, as with the first preferred embodiment. If the chirp signal is not detected, microcontroller 312 increases the pulse-width of the signal provided to low-pass filter 316 such that the signal corresponds to the next possible carrier frequency. This process described above is repeated until the chirp signal is detected in the audio output of the listener's radio.

Figure 4:
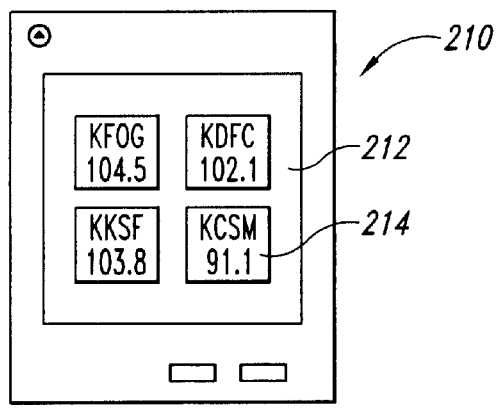
FIG. 4 is a front plan view of a hand-held computer which has been configured according to the present invention.

Other embodiments of the sensing unit depend on the listener to specify the frequency of the broadcast. FIG. 4 illustrates one such embodiment in the form of a common hand-held computer 210 having a touch-activated screen 212. According to the invention, hand-held computer is programmed to display buttons 214 on screen 212. Buttons 214 correspond to the particular listener's preferred radio stations. When the listener desires more information about a particular broadcast, she simply touches the pre-programmed buttons 214 corresponding to the radio station to which the radio receiver is tuned. Hand-held computer 210 is programmed to store the radio station selected and the time it was selected. The listener synchronizes hand-held computer 210 with a standard notebook or desktop computer by any suitable means or uses hand-held computer 210 to communicate directly with the server of the present invention.

Yet another embodiment of the sensing unit of the present invention includes a software application activated by a button on the task bar of a typical graphical user interface on the listener's computer. This embodiment has especial application in the context of Internet audio and video streams, where the listener is typically at or near her computer. In a preferred embodiment, when the listener clicks on the button on the task bar, the task bar application presents the listener with a list of stations in a pop-up menu. The application stores the selected broadcast station and the time for subsequent transmission to the database.

Lastly, the listener may use the telephone to communicate observed physical parameters directly to the server of the present invention. In this embodiment, the listener notes the frequency of the broadcast and telephones the server. The server prompts the listener for the frequency and the time of the observation. The server may use the time of the phone call as a default time value, unless otherwise specified by the listener. Additionally, the server may prompt the listener for the location of the observation or trace the location of the call through conventional means, if possible.

As discussed above, the database for use with physical parameters identifying radio broadcasts associates the physical parameters of frequency and time with data locations or URLs. In addition, a database that includes information relating to more than one geographic area may also include the broadcast area as an additional physical parameter. The broadcast area parameter could be provided by the listener after transmission of the observed physical parameters. Similarly, the broadcast area could be a default value based upon the listener's profile or membership information. In addition, the sensing unit may include a global positioning (GPS) unit providing the listener's geographic location when the user activates the sensing unit.

To construct the database for a particular geographic area, the play lists of participating or desired radio stations must be obtained. A typical play list includes the song title, artist, and a starting time. A play list may also include information relating to the broadcast or advertising. The play list data is used to associate data locations with the physical parameters of time and frequency. For example, a hypothetical musical group named "RockBand" may have a web site denoted by the URL, http://www.rockband.com/. A playlist from a particular radio station, broadcasting over the 102.1 megahertz carrier frequency, reveals that RockBand's latest song will play on May 30, 1999 at 13:05:32 (hh:mm:ss). According to the invention, the data location "http://www.rockband.com/" will be associated with the frequency of 102.1 megahertz and the time of May 30, 1999 at 13:05:32. In one preferred embodiment, a record will be created that includes the frequency of the broadcast, the start time of the song, the name of the song and artist, and the associated data location or URL. As discussed above, this record may also include the geographic area of the broadcast station.

According to the invention, a server receives queries from a client computer over a computer network or a direct dial-up connection and scans the database of the present invention for data locations corresponding to received physical parameters. The server of the present invention may be implemented in hardware or software, or preferably a combination of both. In preferred form, the server is implemented in computer programs executing on programmable computers each comprising at least one processor, a data storage system (including volatile and non-volatile media), at least one input device, and at least one output device. In addition, the server of the present invention may also store the results of each query to develop user profiles and other statistical data for subsequent use.

Additionally, other physical parameters may be employed in the radio broadcasting context according to the present invention. In one preferred embodiment, the physical parameter includes an audio signature or "watermark" embedded in the digital recording data. The sensing unit of this embodiment is programmed to sense the watermark particular to a song or advertisement. The sensing unit stores the watermark upon activation of the unit by the listener. The watermark comprises a unique identification number. According to this embodiment, the server includes records having the unique identification number and at least one corresponding data location or URL. Accordingly, a query that contains an identification number will return an associated data location.

Television Broadcasting

Another application of the present invention lies in television broadcasting. According to the invention, the server is configured similarly to that discussed above in the radio broadcasting context. Each data location has corresponding physical parameters of time and channel frequency. Additional physical parameters may also include broadcast location.

The sensing unit for use with television broadcasting may be incorporated into the remote control unit of the user's television. In one embodiment, the sensing unit stores the currently viewed television channel in a buffer and includes a real-time clock. When the user presses a button on the remote control that activates the sensing unit, the television channel and the signal from the clock are stored in memory. In one embodiment, these stored physical parameters may be transmitted from the remote unit to a computer equipped with an infrared device.

Concert Poster and Other Bar Codes

Another embodiment of the present invention includes the use of bar codes or other graphical patterns to convey information. Accordingly, the observed bar codes or other graphical patterns are the physical parameters observed by a sensing unit and communicated to the server of the present invention. The sensing unit of one preferred embodiment includes a standard bar code reader and a means for storing the data captured by the bar code reader.

By way of example, a concert promoter typically advertises a particular concert by, among other things, displaying posters in a particular area. According to the invention, a bar code or other graphical representation is provided on the poster. If the reader of the poster desires to find a web site with ticket ordering or other information about the concert, he swipes the bar code reader of the sensing unit over the bar code provided on the poster. In one preferred embodiment, the bar code, when read, provides a unique identification number, which the sensing unit stores in memory. When the user has access to a computer, the identification number is transmitted to the server of the present invention, which returns the associated data location or URL.

As one can imagine, bar codes may appear in myriad locations. A vendor could include a bar code in several locations at a trade show booth. Furthermore, many products already include bar codes expressing UPC information. This UPC information could similarly be associated with a data location pointing to the product manufacturer's web site. In another embodiment, a retail store can include bar codes on price tags or stickers. A customer can walk through the retail store show room and scan the bar codes on the price tags using the sensing unit discussed above. Later, when the customer has returned to her home, she may transmit these stored physical parameters to her home computer and access the server of the present invention. The server returns the data location corresponding to the retail store's web site and a list of the items scanned by the customer. The customer uses this list to order these products on the retail store's web site.

In yet another embodiment, the retail store price tag may include UPC information and a vendor identification number. The server of this embodiment returns the data location of the product manufacturer's or distributor's web site to the customer based on the product number. When the customer orders the product through this web site, the vendor identification number is also transmitted. This allows, for example, the retail store to receive a commission on the sale.

Real World Images

In another embodiment, the physical parameters are actual images captured in the physical world. One such image for example, could be a car manufacturer's logo or emblem. The sensing unit of this embodiment includes a digital camera that captures and stores images in digital form. A user seeing a car that is of interest simply points the digital camera at the emblem appearing on the hood and captures the image. The server according to the invention compares the image captured by the digital camera with digital images stored in its database. If a matching image is located, the server returns the associated data location, which in this instance could be the car manufacturer's web site, a local dealer's web site, or both.

Business Card Link

Other embodiments of the present invention contemplate the exchange of physical parameters between sensing units. The sensing units of one preferred embodiment store an identification number that is unique to a particular individual or business entity and have the capability of transmitting this identification number by means of an infrared or sound transmitter. The sensing units of this embodiment also include the ability to read and store the identification number transmitted by other sensing units. For example and in a preferred embodiment, each sensing unit includes an activator button. To exchange identification numbers, the sensing units are pointed at one another and the buttons depressed causing an exchange of identification numbers. Thus, in this instance, the observed physical parameters are infrared or sonic signals expressing an identification number.

The server of the present invention stores an association between these identification numbers and corresponding data locations or URLs. In this manner, two people can exchange links to each other's contact information. This information exchange is dynamic in the sense that, rather than exchanging the information itself, which may change over time, links to information or data locations are exchanged. Therefore, while the link or data location remains the same, the information corresponding to the data location may be constantly refreshed.

Yet another embodiment features a retail store equipped with a radio beacon that transmits infrared or sonic signals expressing an identification number. When a customer is in the retail store, the user may activate the sensing unit to sense the signal and store the retail store's identification number. As above, the customer later transmits the identification number to the server of the present invention to retrieve a data location corresponding to that retail store.

Sightseer/Tourist Example-GPS System

Geographic location may be the primary physical parameter in a server designed to assist sightseers and tourists. The sensing unit in this circumstance may comprise a hand-held or other portable computer equipped with a GPS unit. The user activates the sensing unit such that it records the geographic location provided by the GPS unit. Of course, any suitable device for sensing geographic location may be used, including but not limited to radio-based systems, such as LORAN®, or other satellite receiver navigation systems. The user can also enter into the hand-held computer such search terms as "restaurant," "dining," or "museums" and even a geographic radius within which information is desired. The hand-held computer can then transmit the observed geographic location together with other user-specified information to the server of the present invention by any conventional means. The server then retrieves data locations or URLs corresponding to the observed geographic location and the search terms entered by the user. In a preferred embodiment, the hand-held computer may include an Internet browser such that the user can access the desired information immediately subsequent to receiving the data locations from the server.

Movie Theater

In another preferred embodiment of the present invention, the observed physical parameter is an audio signature embedded in the audio track of a movie preview. The sensing unit of the present invention is configured to recognize the audio signature and store it in memory upon activation by the user. Therefore, when the user desires more information about the movie being previewed, he simply activates the device during the movie preview to store the audio signature. The server of the present invention in response to a data location request containing such audio signature returns the data location corresponding to that particular movie. The web site itself offers, for example, advance ticket sales, a sound track of the movie on CD play times, promotional items, theater locations, and reviews.

SUMMARY

With respect to the above-provided description, one skilled in the art will readily recognize that the present invention has application in a variety of contexts. The foregoing description illustrates the principles of the present invention and provides examples of its implementation. Accordingly, the description is not intended to limit the scope of the claims to the exact embodiments shown and described.

What is claimed is:

1. An apparatus for sensing physical parameter data associated with the operation of a receiver, wherein said physical parameter data comprises the frequency to which the receiver is tuned said apparatus comprising:

a transmitter for transmitting a signal over a carrier frequency to a receiver;

means for detecting whether the receiver output corresponds to said signal;

a clock for generating a time signal; and storage means coupled to said input device, said transmitter, said means for detecting said clock; wherein said storage means stores (a) the time signal corresponding to the time said input device activates said transmitter and (b) the state of the transmitter when said means for detecting determines that the receiver output corresponds to said signal.

2. The apparatus of claim 1 further comprising means for changing the carrier frequency of said signal transmitted by said transmitter.

3. The apparatus of claim 1 further comprising transmission means coupled to said storage means for transmitting the contents of said storage means to a server.

4. The apparatus of claim 2 further comprising transmission means coupled to said storage means for transmitting the contents of said storage means to a server.

5. An apparatus for sensing physical parameter data associated with the operation of a receiver, wherein said physical parameter data comprises the frequency to which the receiver is tuned, wherein the receiver receives a first signal in a modulated domain and produces a corresponding first demodulated signal in a demodulated domain, the apparatus comprising:

means for receiving the first demodulated signal from the receiver;

means for receiving said first modulated signal in the modulated domain and producing a second demodulated signal in the demodulated domain;

means, coupled to each of the receiving means, for detecting a correlation between the first demodulated signal and the second demodulated signal;

a clock for generating a time signal; and storage means coupled to said input device, said means for detecting and said clock; wherein said storage means stores (a) the time signal corresponding to the time said input device activates said means for detecting and (b) the state of the means for detecting when said means for detecting determines that the first demodulated signal corresponds to said signal.

6. The apparatus of claim 5 further comprising transmission means coupled to said storage means for transmitting the contents of said storage means to a server.

* * * * *